US012578438B2

(12) United States Patent
Davydenko

(10) Patent No.: US 12,578,438 B2
(45) Date of Patent: Mar. 17, 2026

(54) DEVICE AND METHOD FOR SCANNING FREQUENCY-MODULATED CONTINUOUS-WAVE LiDAR RANGE MEASUREMENT

(71) Applicant: Scantinel Photonics GmbH, Ulm (DE)

(72) Inventor: Vladimir Davydenko, Bad Herrenalb (DE)

(73) Assignee: Scantinel Photonics GmbH, Ulm (DE)

( * ) Notice: Subject to any disclaimer, the term of this patent is extended or adjusted under 35 U.S.C. 154(b) by 1154 days.

(21) Appl. No.: 17/516,398

(22) Filed: Nov. 1, 2021

(65) Prior Publication Data

US 2022/0334227 A1     Oct. 20, 2022

(30) Foreign Application Priority Data

Apr. 16, 2021     (EP) ..................................... 21168784

(51) Int. Cl.
*G01S 7/481* (2006.01)
*G01S 17/42* (2006.01)
(Continued)

(52) U.S. Cl.
CPC ............ *G01S 7/4817* (2013.01); *G01S 17/42* (2013.01); *G01S 17/58* (2013.01); *G01S 17/931* (2020.01)

(58) Field of Classification Search
CPC ........ G01S 7/4817; G01S 17/42; G01S 17/58; G01S 17/931; G01S 7/4917; G01S 17/34; G01S 17/89; G02F 1/2955; G02F 1/3136
See application file for complete search history.

(56) References Cited

U.S. PATENT DOCUMENTS 8,913,636 B2     12/2014   Roos et al.
11,709,240 B2 *   7/2023   Rezk ..................... G01S 7/4815
                                              356/4.01
(Continued)

FOREIGN PATENT DOCUMENTS

WO     WO 2021021654 A1     2/2021

OTHER PUBLICATIONS

Scantinel Photonics GmbH, Extended European Search Report, Application No. 21168784.3, Sep. 29, 2021, 7 pgs.
(Continued)

*Primary Examiner* — Isam A Alsomiri
*Assistant Examiner* — Joseph C Fritchman
(74) *Attorney, Agent, or Firm* — Morgan, Lewis & Bockius LLP

(57) ABSTRACT

A device for scanning range measurement to an object has a light source that generates an optical output signal having a varying frequency. A plurality of optical processing units are connected optically in parallel to the light source. Each processing unit has an optical distribution matrix with a plurality of optical switches that distribute the optical output signals from the light source selectively to different optical waveguides. A plurality of free space couplers outcouple the optical output signals into the free space, and couple optical output signals, which were reflected on the object, into the associated optical waveguides as optical measurement signals. A polarization sensitive light splitter directs the optical measurement signals detectors that detect a superposition of the optical measurement signals with the optical output signals supplied via a local oscillator light path.

18 Claims, 4 Drawing Sheets

(51) Int. Cl.
    *G01S 17/58*     (2006.01)
    *G01S 17/931*    (2020.01)

(56)            References Cited

U.S. PATENT DOCUMENTS

| | | |
|---|---|---|
| 2017/0371227 A1 | 12/2017 | Skirlo et al. |
| 2018/0364336 A1 | 12/2018 | Hosseini et al. |
| 2019/0265574 A1 | 8/2019 | Skirlo et al. |
| 2019/0377135 A1 | 12/2019 | Mansouri Rad et al. |
| 2020/0088884 A1* | 3/2020 | Sayyah ................... G01S 17/34 |
| 2020/0124711 A1 | 4/2020 | Rezk et al. |
| 2021/0096228 A1* | 4/2021 | Behzadi ................ G01S 7/4815 |
| 2021/0096259 A1 | 4/2021 | Piggott et al. |
| 2021/0181320 A1* | 6/2021 | Oza ......................... G01S 17/58 |
| 2021/0367679 A1* | 11/2021 | Zhao .................... H04B 10/614 |
| 2022/0137198 A1* | 5/2022 | Hamidi ................. G01S 7/4913 |
| | | 356/4.01 |
| 2022/0146645 A1* | 5/2022 | Michaels .............. G01S 7/4914 |

OTHER PUBLICATIONS

Heck, Highly Integrated Optical Phased Arrays: Photonic Integrated Circuits for Optical Beam Shaping and Beam Steering, Dec. 10, 2015, 16 pgs.

* cited by examiner

DEVICE AND METHOD FOR SCANNING FREQUENCY-MODULATED CONTINUOUS-WAVE LiDAR RANGE MEASUREMENT

BACKGROUND OF THE INVENTION

1. Field of the Invention

The invention relates to a device and a method for scanning range—and preferably also velocity—measurement relative to a moving or unmoving object on the basis of FMCW-LiDAR technology. Such devices can be used, for example, in autonomously driving vehicles and can be implemented as photonic integrated circuits (PIC) that do not contain any moving parts.

2. Description of the Prior Art

Frequency-modulated continuous wave (FMCW) is a range and radial velocity measuring technology which was originally developed for RADAR applications. If light instead of radio waves are used, this technology is usually referred to as FMCW-LiDAR, in which LiDAR is an acronym for "Light Detection And Ranging".

In FMCW-LiDAR devices, frequency-modulated light beams scan the environment. A small fraction of the light, which is diffusely reflected at an object, is received and superimposed with a local oscillator wave. The frequency difference between the two signals, which is usually referred to as beat frequency, is measured and used to compute the range of the object and the radial relative velocity. By using a tunable laser as light source and a photodiode as detector, the beat frequency can be extracted directly from the photodiode current, because the photodiode delivers a current that is proportional to the squared sum of the two optical waves ("self-mixing effect").

Scanning devices based on this measurement principle have to be very robust and reliable if they are to be used in vehicles. This is true in particular if the vehicles drive autonomously, since the safety in autonomous driving is decisively dependent on the scanning device that is used to generate a three-dimensional profile of the environment.

Scanning devices which are implemented as photonic integrated circuits do not require moving components and are therefore particularly suitable for applications in vehicles. Such scanners are disclosed, for example, in US 2017/0371227 A1 and US 2019/0377135 A1. These scanning devices include a distribution matrix comprising a plurality of optical switches arranged like a tree. This distribution matrix distribute the optical signals onto different optical waveguides, which are associated with different scanning directions.

However, it is difficult using the prior art approaches to collect sufficient distance information in a short time that so that a three-dimensional profile of the environment can thus obtained in real-time.

US 2019/0265574 A1 discloses an integrated optical beam steering device including a planar dielectric lens that collimates beams from different inputs in different directions within the lens plane. In an embodiment, the device includes a plurality of optical processing units that are connected optically in parallel to the light source.

US 2019/0377135 A1 and US 2018/0364336 A1 disclose LiDAR systems comprising waveguides terminating in free space couplers that are arranged adjacent to a common lens.

SUMMARY OF THE INVENTION

It is an object of the invention to provide a device and a method for scanning measurement of the distance to an object which solve the abovementioned problems.

This object is achieved according to the invention by a device for scanning range measurement to an object, comprising a light source configured to generate an optical output signal having a varying frequency. The device furthermore comprises a plurality of optical processing units that are connected optically in parallel to the light source. Each processing unit comprises an optical distribution matrix comprising a plurality of optical switches and configured to distribute the optical output signal, which is supplied to the respective processing unit, selectively to different optical waveguides. Each processing unit further comprises a plurality of free space couplers, wherein there is a one-to-one correspondence between the optical waveguides and the free space couplers such that each free space coupler is connected to an associated optical waveguide. Each free space coupler is configured to outcouple the optical output signal guided in the associated optical waveguides into the free space, and to couple an optical output signal, which was reflected on the object, into the associated optical waveguide as an optical measurement signal. Each processing unit further comprises a detector configured to detect a superposition of the optical measurement signal with the optical output signal generated by the light source and supplied via a local oscillator light path, and a polarization sensitive light splitter directing the optical measurement signal to the detector. The scanning device further comprises a deflection optical unit configured to deflect the output signals outcoupled from the free space couplers so that they are emitted in different directions, and an evaluation unit configured to determine the range to the object from the superposition detected by the detectors.

By providing a plurality of substantially independent processing units arranged in parallel and all connected to a common light source, it is possible to carry out multiple range measurements simultaneously. The number of the range measurements which can be carried out simultaneously is equal to the number of the processing units and can be multiplied if the light source provides multiple frequency bands simultaneously (more on this below). Nonetheless, the device according to the invention enables very reliable and accurate measurement results, since the signal-to-noise ratio is high at the detectors of the processing units. This is because the measurement signals, which are reflected from the object and are very weak, only have—at most—to pass the comparatively small distribution matrix of a single processing unit to reach the detector. The weak measurement signals are therefore only slightly attenuated by the optical components that must be passed on their way to the detector.

The comparatively small distribution matrices of the individual processing units also have advantages for the output signals propagating in the opposite direction. Since they only pass through few optical switches in the distribution matrix, it is not necessary to provide high intensities at the input of the distribution matrices to ensure sufficient intensities at the output of the free space couplers. In the conventional devices of this type, which have large distribution matrices, high intensities at the inputs of the distribution matrices are unavoidable, since it is only ensured by high intensities that the output signals will still have a sufficiently high intensity even after passing a large number of optical switches when they exit from the free space couplers. However, very high intensities may damage the optical switches and are therefore to be avoided.

When reference is made here and hereinafter to specific optical components or assemblies being connected to one another, this thus also includes nonpermanent connections, i.e., connections which are only temporarily established via optical switches.

In one embodiment, the deflection optical unit has a front focal plane in which the free space couplers or images of the free space couplers are arranged. The optical output signals thus leave the deflection optical unit as collimated light beams, the direction of which is dependent on the location at which the optical output signals exit from a free space coupler. With such an arrangement, additional microlenses behind the free space couplers for the purposes of collimation can be dispensed with.

For the detectors, balanced photodetectors have proven to be particularly suitable, to which both the optical measurement signals reflected from the object and the optical output ("local oscillator") signals generated by the light source are supplied. Such detectors only have low sensitivity to optical noise which is generated by the light source.

In one embodiment, a common optical amplifier is arranged in the light path between the light source and the processing units. Optical amplification can alternatively also take place inside the individual processing units, however.

In another embodiment, the light source is configured to generate simultaneously multiple optical output signals having a varying frequency in different frequency bands. By using a grating, the light in the different frequency bands can be emitted in different directions so that scanning is possible not only in one plane but in two different (preferably orthogonal) planes. In this case, the light source may comprise, for example, a plurality of individual sources, which are connected via a collection matrix, which includes multiple optical switches and/or optical couplers, to the distribution matrix. Instead of a grating, another dispersive optical element can also be provided. This dispersive optical element may be part of the deflection optical unit so that the latter splits the optical output signals depending on the wavelength in a first plane, which is arranged at least essentially perpendicular to a second plane, within which the optical output signals exiting from the free space couplers propagate.

However, scanning in all three spatial directions is also possible if the free space couplers are arranged adjacent and one over another in a regular or irregular two-dimensional array. The deflection optical unit then translates the locations in this array into directions along which the optical output signals propagate.

The light source can be configured to generate an optical output signal, the frequency of which rises linearly and falls linearly alternately over time. Alternatively, the dependence of the frequency on the time can be described by a sawtooth function.

The free space couplers are preferably edge couplers or grating couplers, as are known per se in the prior art.

The polarization sensitive light splitter may be arranged in a light path between one of the free space couplers and the optical distribution matrix. This has the advantage that the weak optical measurement signals that have been reflected from the object do not have to pass the optical switches of the distribution matrix before they impinge on the detector. Consequently, these signals are not further weakened by optical switches, which is beneficial with a view to the signal-to-noise ratio.

Alternatively, the polarization sensitive light splitter may be arranged in a light path between the light source and the optical distribution matrix. In that case, only one detector detector and the components associated therewith, e.g. the polarization sensitive light splitter, are required for each processing unit. Such a configuration is preferred if cost and system complexity are more important than signal-to-noise ratio.

In an embodiment, a waveplate is arranged in free space so that at least the optical output signals outcoupled from two free space couplers impinge on the waveplate. If the waveplate is a quarter-wave plate and the optical output signals are TE polarized, for example, the waveplate converts the linear state of polarization into a circular state of polarization. Also the optical measurement signals are then circularly polarized, and after passing the quarter-wave plate, their state of polarization is converted into TM polarization. In this manner, the polarization sensitive light splitter can split off the received measurement signals and direct them towards the detector. However, also other polarization schemes can be applied, but they may require more or more complex components.

Using an external waveplate that is not integrated into the individual light paths is particularly simple. However, it is also contemplated to use waveplates that are intergrated into the individual light paths.

In an embodiment, each processing unit comprises a polarization rotator arranged in a light path between the polarization sensitive light splitter and the detector or in the local oscillator light path. This is particularly useful if the device comprises a quarter-wave plate, because then the measurement signals coming from the polarization sensitive light splitter and the local oscillator signals have different states of polarization so that they cannot interfere on the detector. Therefore, a polarization rotator, for example a half wave plate, should be inserted either in the light path between the polarization sensitive light splitter or in the local oscillator light path.

In another embodiment, each processing unit comprises a variable attenuator arranged in the local oscillator light path. The variable attenuator attenuates the local oscillator signals by a degree that can be controlled by applying a voltage to the variable attenuator, for example. This is particularly useful if the detector is a balanced photodetector that reduces common noise components only if the signals to be detected have an approximately equal optical power. The variable attenuator may then be part of an electrical auto-balancing circuit ensuring that the optical power of the local oscillator signal is approximately equal to the optical power of the measurement signals.

With regard to the method, the above stated object is solved by a method for scanning range measurement to an object, comprising the following steps:

a) generating optical output signals having a varying frequency;

b) guiding the optical output signals through multiple optical processing units that are arranged optically in parallel;

c) distributing, in each optical processing unit, the optical output signals to a plurality of optical waveguides using optical switches of a distribution matrix;

d) outcoupling, in each optical processing unit, the optical output signal into the free space, wherein optical output signals outcoupled at different points in time are emitted in different directions;

e) coupling, in each optical processing unit, optical output signals, which have been reflected on the object, as optical measurement signals into the optical wave-guides;

f) changing a polarization direction of the optical mea-surement signals;

g) guiding, in each optical processing unit, the optical measurements signals via a polarization sensitive light splitter to a detector of the respective processing unit;

h) detecting a superposition of the optical measurement signals with the optical output signals generated by the light source; and i) determining the range to the object based on the detected superposition.

The measurement optical signals may impinge on the polarization sensitive light splitter after passing the distri-bution matrix, or without passing the distribution matrix.

In an embodiment, the polarization direction of the optical measurement signals is changed before the superposition with the optical output signals.

In another embodiment, the optical signals generated by the light source are variably attenuated before they are superimposed with the measurement optical signals.

BRIEF DESCRIPTION OF THE DRAWINGS

Further features and advantages of the invention will become apparent from the following description of exem-plary embodiments with reference to the drawings, in which.

DESCRIPTION OF PREFERRED EMBODIMENTS

1. Typical Application

Figure 1:
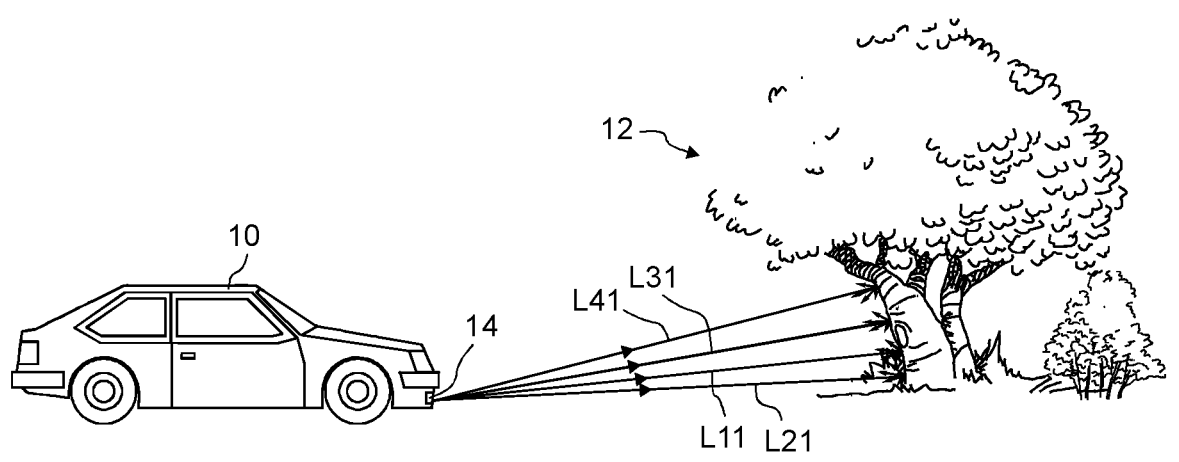
FIG. 1 is a schematic side view of a vehicle approaching an object which is detected by a scanning device according to the invention.

FIG. 1 is a schematic side view showing a vehicle 10 that approaches an object 12 represented by a tree. The vehicle 10 has a scanner device 14 that scans the environment lying ahead of the vehicle 10 with light beams L11, L21, L31, and L41. From range information associated to each light beam, a three-dimensional image of the environment is computa-tionally reconstructed. In addition, the scanner device 14 determines the relative velocity to the object 12. This information is particularly important if the object 12 is not fixed, but moves, too.

The information computed by the scanner device 14 about the environment lying ahead of the vehicle 10 may be used, for example, to assist the driver of the vehicle 10 in various ways. For example, warning messages may be generated if a collision of the vehicle 10 with the object 12 threatens. If the vehicle 10 drives autonomously, range and velocity information about the environment lying ahead are required by the algorithms that control the vehicle 10.

Figure 2:
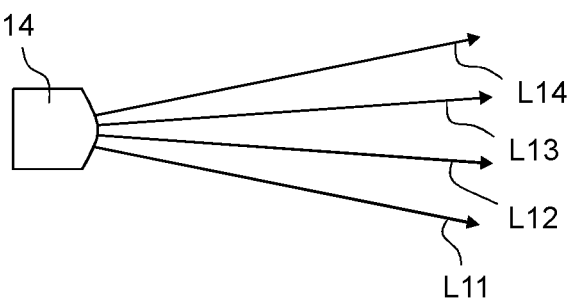
FIG. 2 is a top view of the scanning device shown in FIG. 1.

As is apparent in FIG. 1, the scanner device 14 emits the light beams L11 to L41 in different directions in a vertical plane (i.e. the plane of the paper in FIG. 1) so that the environment is scanned in the vertical direction. Scanning also takes place in the horizontal direction, as FIG. 2 illustrates in a top view of the scanner device 14. Four light beams L11, L12, L13 and L14 are emitted in a horizontal plane in different directions.

For the sake of simplicity it is assumed in FIGS. 1 and 2 that only four light beams Ln1 to Ln4 are emitted vertically and horizontally. However, in real applications the scanner device 14 emits many more light beams. For example, $k \cdot 2^n$ light beams are preferred, wherein n is a natural number which is typically between 7 and 13 and specifies how many beams are emitted in one of k (horizontal or inclined) planes, wherein k is a natural number which is typically between 1 and 16.

2. First Embodiment

Figure 3:
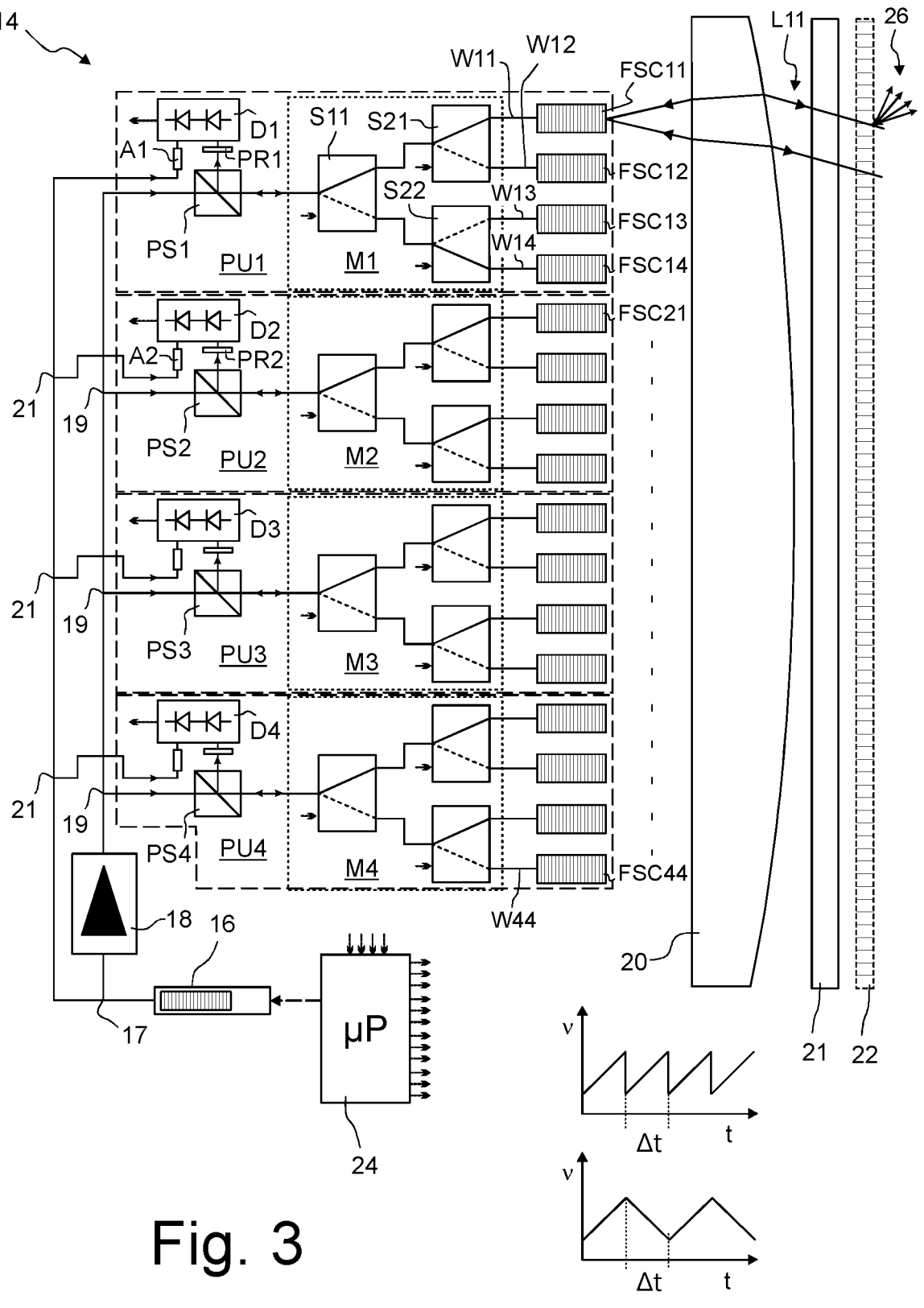
FIG. 3 schematically shows the architecture of the scan-ning device according to a first embodiment.

FIG. 3 shows schematically the basic architecture of the scanning device 14. The scanning device 14, which is preferably constructed as a photonic integrated circuit (PIC), can in reality appear quite different, particularly with regard to the dimensions and the arrangement of the components.

The scanning device 14 comprises a light source 16, which generates an optical FMCW signal. The light source 16 thus does not generate, in contrast to conventional scanning devices, short light pulses having high pulse power, but rather a continuous signal having a varying frequency v. The dependence of the frequency v on the time t can be given, for example, by a sawtooth function or by a periodic triangular function, as the two graphs contained in FIG. 3 illustrate. In the case of a sawtooth function, the frequency v rises linearly during a measurement interval Δt, then jumps back to its original value, again rises linearly at the same slope, etc. The duration of the measurement interval Δt is longer than the duration which the light emitted by the scanning device 14 requires to arrive back at the scanning device 14 after reflection on the object 12. In the case of a periodic triangular function, the frequency v is a linear function of the time t, wherein the sign of the slope changes between successive measurement intervals Δt. The measurement intervals Δt have a duration which is prefer-ably between 10 μs and 100 μs.

The light source 16 may include, for example, a DFB or DBR laser diode emitting light at a wavelength of 1550 nm with a bandwidth between approximately 200 nm and 300 nm. To achieve an even shorter bandwidth, the laser diode may have an external cavity, as this is known in the art as such. The frequency modulation (chirp) may be caused by appropriately controlling the driving current of the laser. In other embodiments, the optical signal generated by the laser is modulated by an external modulator being part of a feedback loop, as this described, for example, in U.S. Pat. No. 8,913,636 B2.

The optical output signals generated by the light source 16 are amplified by an amplifier 18 and then distributed via three splitters 19 to four processing units PU1 to PU4, which are each framed by dashed lines in FIG. 3. The processing units PU1 to PU4 are thus arranged optically in parallel to one another. The splitters 19, which are arranged between the amplifier 18 and the processing units PU1 to PU4, are preferably designed such that optical output signals having the same intensity are applied at the inputs of the processing units PU1 to PU4 at a given point in time. In principle, however, it is also possible to allocate the optical intensity of the output signal unevenly, for example if the light emitted by the scanning device 14 should have a higher intensity in certain directions, or if additional amplifiers are provided in some or all processing units PU1 to PU4.

The structure of the four processing units PU1 to PU4 is identical and is explained in more detail hereinafter exemplarily for the processing unit PU1.

The processing unit PU1 contains a distribution matrix M1, which has the structure of a tree having multiple levels. In the embodiment shown, the tree has only two levels for the sake of simplicity. One optical switch S11 is arranged on the first level and two optical switches S21, S22 are arranged on the second level. Each switch S11, S21, S22 is designed as a 1×2 switch and may include, for example, a thermo-optical Mach-Zehnder interferometer. As a result of the tree structure, the distribution matrix M1 can distribute an output signal applied at the input selectively to each of the four optical waveguides W11 to W14.

Each of the four waveguides W11 to W14 is connected to a free space coupler FSC11 to FSC14. The free space couplers FSC11 to FSC14 may be designed, for example, as grating couplers or as edge couplers, as is known as such in the art. The free space couplers FSC11 to FSC14 are used to outcouple the optical output signals guided in the optical waveguides W11 to W14 into the adjoining free space and to couple optical output signals, which were reflected on the object 12, as optical measurement signals back into the waveguides W11 to W14.

The processing unit PU1 further comprises a detector D1, which detects a superposition of the optical measurement signal reflected from the object 12 with a reference signal. This reference signal, which is usually referred to as "local oscillator", is obtained by branching-off, via couplers 21, a small part of the optical output signal generated by the light source 16. The detector D1 is formed in this embodiment by a balanced photodetector, which is particularly advantageous for heterodyne detection because its electrical output signal is significantly less affected by noise and other fluctuations common to both signals. In the most simple case of balanced detection, two photodiodes are connected such that their photocurrents cancel if the optical signals are identical.

The processing unit PU1 further comprises a polarization sensitive light splitter PS1 that is arranged in a light path between the light source 16 and the optical distribution matrix M1. The polarization sensitive light splitter PS1 ensures that the optical output signals generated by the light source 16 are directed to the distribution matrix M1, and the optical measurement signals coming from the distribution matrix M1 are directed to the detector D1. Since photonic integrable polarization sensitive light splitters are known in the art as such, their structure will not be described in more detail at this point.

In a light path between the polarization sensitive light splitter PS1 and the detector D1 a polarization rotator PR1 is arranged. The polarization rotator PR1 functions as a halfwave plate and therefore rotates a linear state of polarization of the measurements signals directed to the detector D1 by 90°.

The processing unit PU1 further comprises a variable attenuator A1 arranged in a local oscillator light path between the light source 16 and the detector D1. The variable attenuator attenuates the local oscillator signals by a degree that can be controlled by applying a voltage to the variable attenuator A1.

As already explained above, the other three processing units PU2 to PU4 have the same structure. The free space couplers FSC of the four processing units PU1 to PU4 are arrayed in the illustrated embodiment along a line adjacent to one another, specifically with a pitch p having a value between 25 μm and 400 μm. The free space couplers FSC are located in this embodiment in the front focal plane of a deflection optical unit 20 that deflects the output signals outcoupled from the free space couplers FSC such that they are emitted in different directions. The deflection optical unit 20 may be formed by a single lens element or an objective comprising a plurality of lens elements, by a Fresnel lens or by a diffractive optical element (DOE) having a spatially varying grating constant. As a result of this arrangement in the front focal plane, there is an unambiguous one-to-one relationship between each free space coupler FSC and an emission direction.

Figure 4:
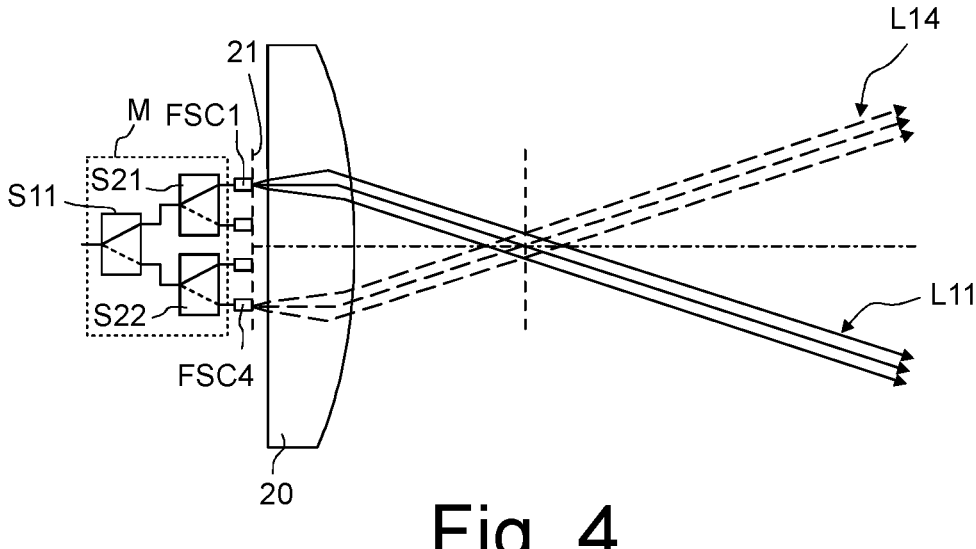
FIG. 4 schematically shows a single distribution matrix and the deflection optical unit of the scanning device shown in FIG. 3.

FIG. 4 illustrates this relationship in a simplified illustration. Only one single distribution matrix M1 is shown, which distributes optical output signals onto four free space couplers FSC1 to FSC4. The output signals exiting divergently in the front focal plane 21 from the free space couplers FSC1 to FSC4 are collimated by the deflection optical unit 20 and deflected in different directions. If the optical signals are switched in series onto the free space couplers FSC1 to FSC4, the light beams emerging from the scanning device 14 travel from the direction indicated by solid lines (light beam L11) step-by-step to the direction indicated by dashed lines (light beam L14).

Referring again to FIG. 3, the scanning device 14 further comprises a quarter-wave plate 21 and a dispersive optical element 22. The order of the deflection optical unit 20, the quarter-wave plate 21 and the dispersive optical element 22 does not matter and may therefore be changed.

The optical switches S11, S21, S22 of the distribution matrices M1 to M4, the light source 16 and the variable attenuators A1 to A4 are controlled by a control and evaluation unit 24, which is represented in FIG. 3 by a microprocessor μP. The control and evaluation unit 24 is additionally connected to the electrical outputs of the detectors D1 to D4.

3. Function

In the following the function of the scanning device will be explained in more detail.

The DFB or DBR laser diode used as light source 16 generates light that is linearly polarized. In the following it is assumed that the light is in the $TE_{00}$ mode, as this is usually the case. The optical waveguides connecting the light source with the remaining components are designed so that only the $TE_{00}$ mode can propagate. The waveguides therefore have an additional polarizing or "clean-up" effect removing any TM mode components from the light signals.

After amplification in the amplifier 18, which does not affect the state of polarization, the optical output signals are guided to the polarization sensitive light splitter PS1 to PS4 of the processing units PU1 to PU4. The polarization sensitive light splitter PS1 to PS4 are designed so that the TE passes the respective splitter without being deflected.

The optical output signals, still in the TE mode, are then guided to the distribution matrix M1 to M4 of the respective processing units PU1 to PU4. The distribution matrices M1 to M4 selectively distribute the optical signals to one of the free space couplers FSC11 to FSC44. As a result of the parallel arrangement of the processing units PU1 to PU4, exactly one optical output signal exits during each measurement interval Δt from each processing unit PU1 to PU4. Since there are four processing units PU1 to PU4 in this embodiment, four optical output signals are emitted simultaneously by the scanning device 14. The four optical output signals are then deflected by the deflection optical unit 20 in a direction which is determined by the location of the relevant free space coupler FSC11 to FSC 44 in the focal plane of the deflection optical unit 20, as this has been explained above with reference to FIG. 4.

The deflected light beams then pass the quarter-wave plate 21 which converts the linear state of polarization into a circular state of polarization.

It is assumed hereinafter that the light beams emerging from the scanning device 14 are the light beams L11 to L14 that are shown in FIG. 2. If these light beams L11 to L14 emitted in a horizontal plane are incident on the object 12, they are diffusely reflected on its surface and thus radiated back over a larger solid angle range. A small part of the light incident on the object 12 is retroreflected, i.e., radiated back in the same direction along which the light has propagated on the path to the object 12. The light paths of the optical output signals and the measurement signals reflected on the object 12 for the free space coupler FSC11 are indicated by arrows for the light beam L11 in FIG. 3. After reflection at the object 12, the light is still (at least basically) circularly polarized.

The light beams reflected at the object 12 pass the quarter-wave plate 21 which converts the circular state of polarization into a linear TM state of polarization. The TM polarized light beams are coupled into the free space couplers FSC11 to FSC44, pass the switches S11 to S44 of the respective distribution matrix M1 to M4 and reach the polarization sensitive light splitter PS1 to PS4 of the respective processing unit PU1 to PU4. Since the measurement signals are now TM polarized, they are deflected by the polarization sensitive light splitter PS1 to PS4 towards the detectors D1 to D4 of the respective processing unit PU1 to PU4. In the polarization rotator PR1 to PR4 the state of polarization is converted from TM into TE mode. On the detector D1 to D4, the received TE polarized optical measurement signals are superimposed with the TE polarized local oscillator reference signals that have been branched-off, via couplers 21, from the optical output signal generated by the light source 16.

The polarization sensitive light splitter PS1 to PS4 can therefore, together with the polarization rotators PR1 to PR4 and the quarter-wave plate 21, be regarded as simplified optical circulators ensuring that the optical measurement signals can enter the same waveguides W11 to W44 through which the optical output signals propagated, but are nevertheless not directed back to the light source 16, but to the detectors D1 to D4.

The variable attenuators A1 to A4 are connected to an electrical auto-balancing circuit (not shown) and ensure that the optical power impinging upon each photodiode of the balanced photodetectors forming the detectors D1 D4 are approximately equal. Only then the effective output of the balanced pair of photodiodes is zero unless there is some difference in the intensity of one of the optical signals. When this occurs, it causes the pair to become "unbalanced" and a net signal appears on the output of the detector D1 to D4. In other embodiments, the attenuators A1 to A4 form part of other optical components in the light path between the light source 16 and the detectors D1 to D4. For example, the attenuators A1 to A4 may be incorporated into the splitters 21 connecting the light source 16 to the detectors D1 to D4. By electrically controlling the splitting ratio of the splitters 21, the intensity of the local oscillator signals can be accurately and individually controlled.

During the period which the light requires for the path to the object 12 and back, the frequency of the optical output signals generated by the light source 16 has changed. Since the optical output signals and the measurement signals have similar frequencies, the superposition results in a beat having a frequency that can be ascertained by calculating the FFT (Fast Fourier Transform). The beat frequency can be converted directly into a distance value. In addition, the relative velocity between the vehicle 10 and the object 12 can be inferred from the Doppler shift. Interference signals from the ambient light or from scanning devices of other vehicles 10 cannot impair the measurement due to a lack of coherence with the output signals generated by the light source 16.

These calculations are carried out by the control and evaluation unit 24. It associates the calculated distances and relative velocities with the directions in which the optical output signals were emitted by the deflection optical unit 20. A three-dimensional image of the environment is thus obtained.

The significance of the optional dispersive optical element 22, which can be designed, for example, as an optical grating, is explained hereinafter. The dispersive optical element 22 splits the optical signals depending on the wavelength in a plane, which is arranged at least essentially perpendicular to the plane within which the optical output signals exiting from the free space couplers FSC11 to FSC44 propagate. This wavelength-dependent splitting perpendicular to the plane of the paper is indicated in FIG. 3 by a beam bundle 26. Within a horizontal scanning plane, as shown in FIG. 2, the light beams L11 to L14 have, for example, frequencies within a first frequency band, the light beams L21 to L24 of the next scanning plane inclined thereto have frequencies in a second frequency band different therefrom, etc.

To be able to generate multiple optical output signals in different frequency bands simultaneously, the light source 16 may contain multiple individual sources (not shown) generating optical output signals in different frequency bands that are superimposed, so that all processing units PU1 to PU4 receive optical output signals in multiple frequency bands simultaneously.

Scanning perpendicular to the plane of the paper can alternatively be accomplished in a conventional manner with the aid of a rotating mirror, for example. Since such a mirror only has to rotate around a single axis, it can be constructed in a simple and mechanically robust manner. However, it is preferable also for this scanning direction to dispense with the use of movable components.

Due to the parallel arrangement of the processing units PU1 to PU4 each having a relatively small number of optical switches S11, S21, S22, the measurement light reflected from the object 12 has to pass through few optical switches and only one of the polarization light splitters PS 1 to PS4 on its path to one of the detectors D1 to D4. In a distribution matrix having 8 outputs, the insertion loss of the entire distribution matrix is, for example, approximately 3 dB, which corresponds to a loss of approximately 50%. The reflected measurement signal is thus attenuated relatively little on its path to the respective detector and can be detected with a sufficiently high signal-to-noise ratio. A high pixel rate is nonetheless achieved, since multiple (here: four) light beams can be generated simultaneously.

The provision of the multiple processing units PU1 to PU4 has also the benefit that it is not necessary to provide optical signals with a very high optical intensity. Such signals would be necessary, due to the then greater overall insertion loss, in the case of a single large distribution matrix having a high number of levels. However, it has turned out that such high intensity optical signals may damage—at least in the long run—the affected optical switches, i.e. the switches on the lowest level of the distribution matrix. The provision of multiple parallel processing units PU1 to PU4 using relatively small distribution matrices avoid such problems.

5. Second Embodiment

Figure 5:
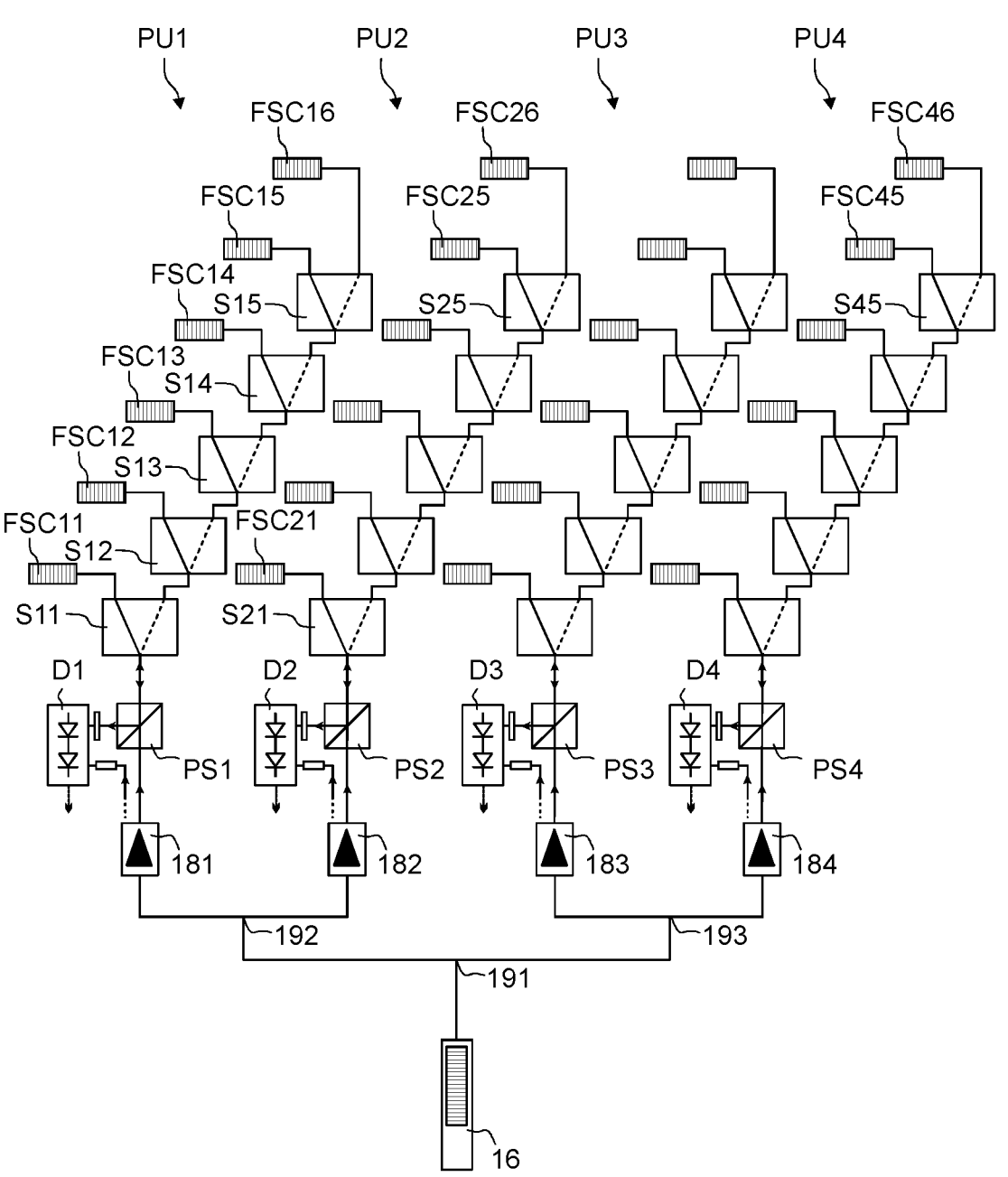
FIG. 5 schematically shows the architecture of a process-ing unit of a scanning device according to a second embodi-ment in which the switches of the distribution matrix are cascaded.

FIG. 5 shows an embodiment which differs from the first embodiment shown in FIG. 3 mainly in that the switches of the distribution matrices are not arranged in a tree structure, but in a cascaded structure. While in a tree structure the switches in all levels with the exception of the highest level are connected only to other switches, the 1×2 switches in a cascaded structure connect the exit port of a switch of the previous level to one waveguide terminating in a free space coupler and to the input port of a switch of the next level (similarly for 1×n switches). In the embodiment shown, each processing unit PU1 to PU4 comprises five switches and six free space couplers. In the processing unit PU1, the first switch S11 of the lowest level is connected to a first free space coupler FSC11 and the switch S12 of the next level. This switch S12 is connected to a second free space coupler FSC12 and the switch S13 of the next level, and so on.

This cascaded structure has the disadvantage that the number of switches the optical signals must pass on their way to the free space and back to the detector strongly varies, namely between 2×1 and 2×5 in this embodiment. Optical signals that passed 10 switches are weaker than optical signals that passed only two switches. Weaker signals result in a lower signal-to-noise ratio and may lead to a reduced measurement accuracy.

On the other hand, this can be beneficial in cases in which not all directions are equivalent. For example, if it is desired that more accurate range and velocity measurements shall be performed in the center of the field of view, the accuracy may be improved by associating the first and second free space couplers FSCn1 and FSCn2 with such center directions, with n being the number of the processing unit PUn. Then the optical signals associated with these directions have to pass only one or two switches Sn1, Sn2 on their way to the free space and back to the detector, and the signal-to-noise ratio will be significantly larger than for the other directions.

In contrast to the embodiment shown in FIG. 3, there are four amplifiers 181 to 184 that receive, through splitters 191, 192 and 193, equal optical signals. Such an arrangement may also be advantageous with a view to the manufacturing process of the photonic integrated circuit (PIC). For example, the amplifiers 181 to 184 may be arranged on a separate substrate so they can be lithographically defined and processed independent from the other components of the PIC.

6. Third Embodiment

Figure 6:
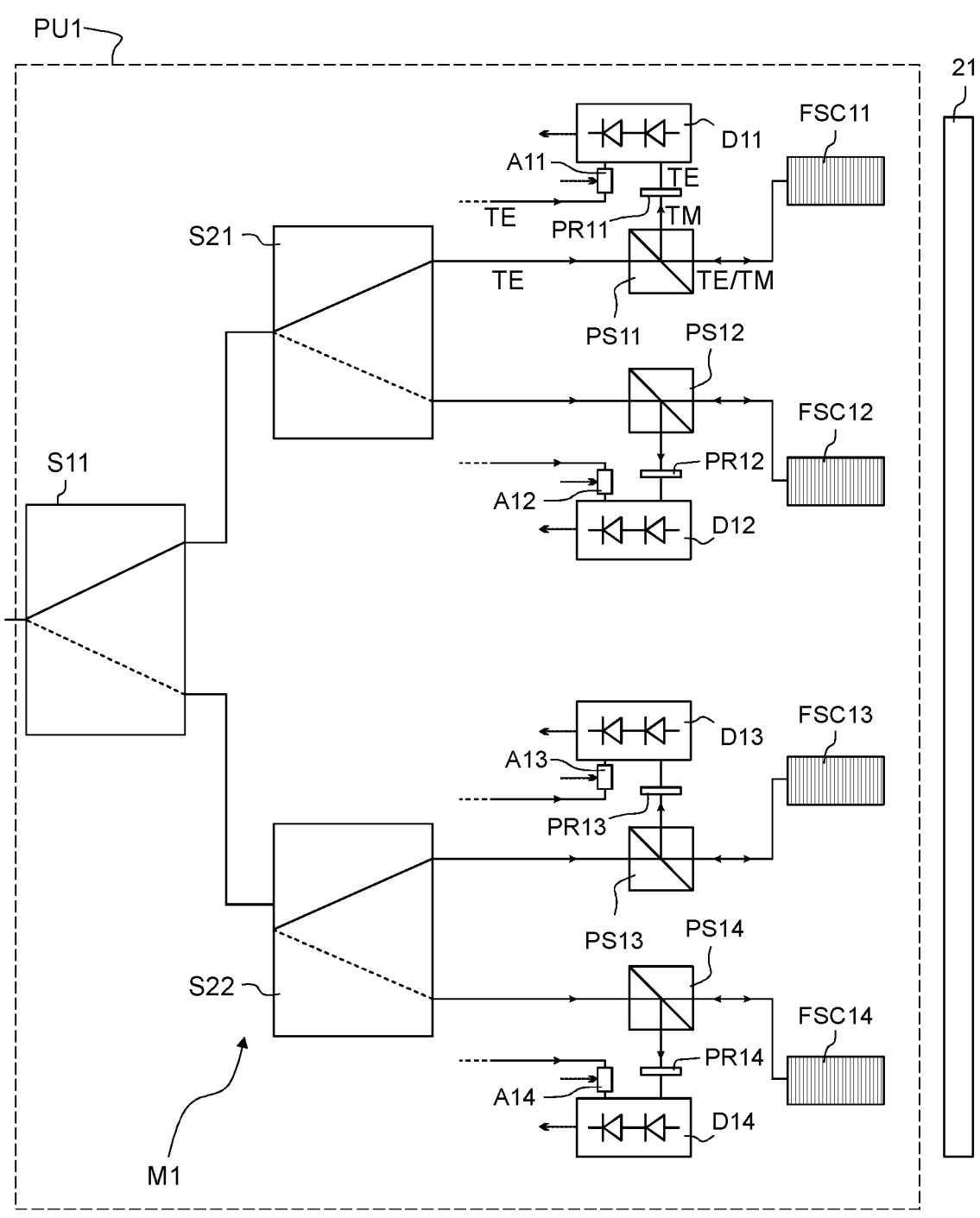
FIG. 6 schematically shows the architecture of a process-ing unit of a scanning device according to a third embodi-ment in which to each free space coupler a detector and a polarization sensitive light splitter is associated.

FIG. 6 shows a processing unit PU1 of an embodiment in which polarization sensitive light splitters are arranged in a light path between the free space couplers FSC11 to FSC14 and the optical distribution matrix M1. This has the advantage that the weak optical measurement signals that have been reflected from the object 12 do not have to pass the optical switches S11, S21, S22 of the distribution matrix M1. Consequently, these signals are not subjected to the insertion loss associated with the switches S11, S21, S22, entailing a higher signal-to-noise ratio and a potentially higher measurement accuracy.

The drawback of this architecture is a higher system complexity. The free space couplers FSC11 to FSC14 of a processing unit PU1 to PU4 do not share, as in the other embodiments, a single common detector and the components that are associated therewith, i.e. a polarization sensitive light splitter, a polarization rotator and an attenuator. Instead, each free space coupler FSC11 to FSC14 of the processing unit PU1 requires its own detector D11 to D14, a polarization rotator PR11 to PR14 and an attenuator A11 to A14.

The choice between the arrangement of the polarization sensitive light splitters in front of or behind the distribution matrices is thus mainly a trade-off between system complexity and associated costs on the one hand and improved performance on the other hand. Since the number of identical components in a fully integrated PIC design has no significant impact on the costs, the position of the polarization sensitive light splitters between the free space couplers and the distribution matrices is generally preferred.

The invention claimed is:

1. A device for scanning range measurement to an object, comprising
    a light source configured to generate an optical output signal having a varying frequency,
    a plurality of optical processing units that are connected optically in parallel to the light source, wherein each processing unit comprises:
        an optical distribution matrix comprising a plurality of optical switches and configured to distribute the optical output signal, which is supplied to the respective processing unit, selectively to different optical waveguides,
        a plurality of free space couplers, wherein there is a one-to-one correspondence between the optical waveguides and the free space couplers such that each free space coupler is connected to an associated optical waveguide, and wherein each free space coupler is configured to
            outcouple the optical output signal guided in the associated optical waveguides into the free space, and
            to couple an optical output signal, which was reflected on the object, into the associated optical waveguide as an optical measurement signal,
        and wherein each processing unit further comprises
        a detector configured to detect a superposition of the optical measurement signal with the optical output signal generated by the light source and supplied via a local oscillator light path, and
        a photonically integrated polarization sensitive light splitter directing the optical measurement signal guided in the associated optical waveguide to the detector,
    and wherein the device further comprises
    a deflection optical unit configured to deflect the optical output signals outcoupled from the free space couplers so that they are emitted in different directions, and an evaluation unit configured to determine the range to the object from the superposition detected by the detectors.

2. The device of claim 1, wherein the deflection optical unit has a front focal plane in which the free space couplers or images of the free space couplers are arranged.

3. The device of claim 1, wherein the light source is configured to generate multiple optical output signals having a varying frequency in different frequency bands simultaneously.

4. The device of claim 1, wherein the light source is configured to generate an optical output signal having a frequency that linearly rises and linearly falls alternately over time.

5. The device of claim 1, wherein the polarization sensitive light splitter is arranged in a light path between one of the free space couplers and the optical distribution matrix.

6. The device of claim 1, wherein the polarization sensitive light splitter is arranged in a light path between the light source and the optical distribution matrix.

7. The device of claim 1, comprising a waveplate arranged in free space so that at least the optical output signals outcoupled from two free space couplers impinge on the waveplate.

8. The device of claim 1, wherein each processing unit comprises a polarization rotator arranged in a light path between the polarization sensitive light splitter and the detector or in the local oscillator light path.

9. The device of claim 1, wherein each processing unit comprises a variable attenuator arranged in the local oscillator light path.

10. A method for scanning range measurement to an object, comprising the following steps:

a) generating optical output signals having a varying frequency with a light source;

b) guiding the optical output signals through multiple optical processing units that are arranged optically in parallel;

c) distributing, in each optical processing unit, the optical output signals to a plurality of optical waveguides using optical switches of a distribution matrix;

d) outcoupling, in each optical processing unit, the optical output signal into the free space with a plurality of free space couplers, wherein there is a one-to-one correspondence between the optical waveguides and the free space couplers such that each free space coupler is connected to an associated optical waveguide, and wherein optical output signals outcoupled at different points in time are emitted in different directions;

e) coupling, in each optical processing unit, optical output signals, which have been reflected on the object, as optical measurement signals into the optical waveguides;

f) changing a polarization direction of the optical measurement signals;

g) guiding, in each optical processing unit, the optical measurements signals guided in the associated optical waveguide via a photonically integrated polarization sensitive light splitter to a detector of the respective processing unit;

h) detecting a superposition of the optical measurement signals with the optical output signals generated by the light source; and i) determining the range to the object based on the detected superposition.

11. The method of claim 10, wherein the measurement optical signals impinge on the polarization sensitive light splitter after passing the distribution matrix.

12. The method of claim 10, wherein the measurement optical signals impinge on the polarization sensitive light splitter without passing the distribution matrix.

13. The method of claim 10, wherein the polarization direction of the optical measurement signals is changed before the superposition with the optical output signals.

14. The method of claim 10, wherein the optical signals generated by the light source are variably attenuated before they are superimposed with the measurement optical signals.

15. A device for scanning range measurement to an object, comprising a light source configured to generate an optical output signal having a varying frequency, a plurality of optical processing units that are connected optically in parallel to the light source, wherein each processing unit comprises:

an optical distribution matrix comprising a plurality of optical switches and configured to distribute the optical output signal, which is supplied to the respective processing unit, selectively to different optical waveguides, a plurality of free space couplers, wherein there is a one-to-one correspondence between the optical waveguides and the free space couplers such that each free space coupler is connected to an associated optical waveguide, and wherein each free space coupler is configured to outcouple the optical output signal guided in the associated optical waveguides into the free space, and to couple an optical output signal, which was reflected on the object, into the associated optical waveguide as an optical measurement signal, and wherein each processing unit further comprises a detector configured to detect a superposition of the optical measurement signal with the optical output signal generated by the light source and supplied via a local oscillator light path, and a photonically integrated polarization sensitive light splitter directing the optical measurement signal guided in the associated optical waveguide to the detector and arranged in a light path between one of the free space couplers and the optical distribution matrix, and wherein the device further comprises a waveplate arranged in free space so that at least the optical output signals outcoupled from two free space couplers impinge on the waveplate, a deflection optical unit configured to deflect the optical output signals outcoupled from the free space couplers so that they are emitted in different directions, and an evaluation unit configured to determine the range to the object from the superposition detected by the detectors.

16. The device of claim 15, wherein the light source is configured to generate an optical output signal having a frequency that linearly rises and linearly falls alternately over time.

17. The device of claim 15, wherein each processing unit comprises a polarization rotator arranged in a light path between the polarization sensitive light splitter and the detector or in the local oscillator light path.

18. The device of claim 15, wherein each processing unit comprises a variable attenuator arranged in the local oscillator light path.

* * * * *